United States Patent
Barki (10) Patent No.: US 11,206,230 B2
(45) Date of Patent: Dec. 21, 2021

(54) MANAGING EXCHANGE OF INSTANT MESSAGES USING AN ASSIGNED COMMUNICATION CODE

(71) Applicant: PUBLIC IM LTD., Tel Aviv (IL)

(72) Inventor: Yaakov Barki, Tel Aviv (IL)

(73) Assignee: Pim Communication Technologies Ltd., Tel Aviv (IL)

( * ) Notice: Subject to any disclaimer, the term of this patent is extended or adjusted under 35 U.S.C. 154(b) by 0 days.

(21) Appl. No.: 16/755,877

(22) PCT Filed: Oct. 23, 2018

(86) PCT No.: PCT/IL2018/051130
§ 371 (c)(1),
(2) Date: Apr. 13, 2020

(87) PCT Pub. No.: WO2019/082179
PCT Pub. Date: May 2, 2019

(65) Prior Publication Data
US 2020/0382456 A1    Dec. 3, 2020

Related U.S. Application Data

(60) Provisional application No. 62/575,529, filed on Oct. 23, 2017.

(51) Int. Cl.
*H04L 12/58* (2006.01)
(52) U.S. Cl.
CPC ............ *H04L 51/046* (2013.01); *H04L 51/18* (2013.01); *H04L 51/28* (2013.01); *H04L 51/32* (2013.01)

(58) Field of Classification Search
CPC ..... H04L 43/0817; H04L 41/12; H04L 67/10; H04L 41/0213; H04L 41/048;
(Continued)

(56) References Cited

U.S. PATENT DOCUMENTS 6,023,587 A * 2/2000 Watts, Jr. ............ G06F 1/1632
710/72
9,246,924 B2 * 1/2016 Sukumaran ........... H04L 63/102
(Continued)

FOREIGN PATENT DOCUMENTS

| KR | 101654261 B1 | 9/2016 | |
| WO | WO-2009026847 A1 * | 3/2009 | ........... G06Q 10/107 |
| WO | WO-2015145430 A1 * | 10/2015 | ............. G06Q 40/02 |

*Primary Examiner* — Ninos Donabed
(74) *Attorney, Agent, or Firm* — Finnegan, Henderson, Farabow, Garrett & Dunner, LLP (57) ABSTRACT

A method, system and a computer program product for managing exchange of instant messages (IM), comprising: receiving a request from an initiator to generate an IM code (IM code), the IM code is used as an identifier of the initiator, the request includes at least one IM code property that facilitates regulation of IMs originated by any one of at least one participant in an exchange of IMs with the initiator, or received by anyone of the at least one participant in an exchange of IMs with the initiator; generating the IM code according to the at least one IM code property and distributing the IM code, for use by anyone of the at least one participant; identifying that an active participant of the at least one participant inputs the IM code; and selectively regulating IMs originated by or received by the active participant according to the IM code properties.

13 Claims, 6 Drawing Sheets

(58) Field of Classification Search
CPC ............... H04L 41/0681; H04L 41/082; H04L 43/0811; H04L 51/046; H04L 51/18; H04L 51/28; H04L 51/32; G06F 9/45558; G06F 2009/45591
See application file for complete search history.

(56) References Cited

U.S. PATENT DOCUMENTS

| | | | | |
|---|---|---|---|---|
| 9,374,379 B1* | 6/2016 | Hew | | H04L 67/306 |
| 10,114,802 B2* | 10/2018 | Huang | | G06F 3/04817 |
| 10,643,197 B2* | 5/2020 | Melzer | | H04L 51/046 |
| 2003/0112870 A1* | 6/2003 | Fukuda | | H04N 19/59 |
| | | | | 375/240.12 |
| 2005/0267942 A1* | 12/2005 | Quinn | | H04L 51/04 |
| | | | | 709/206 |
| 2006/0041684 A1* | 2/2006 | Daniell | | H04L 51/04 |
| | | | | 709/246 |
| 2007/0067404 A1 | 3/2007 | Brown | | |
| 2007/0297408 A1* | 12/2007 | Kim | | H04L 51/12 |
| | | | | 370/392 |
| 2008/0005325 A1* | 1/2008 | Wynn | | G06Q 10/107 |
| | | | | 709/225 |
| 2009/0157799 A1* | 6/2009 | Sukumaran | | H04L 67/306 |
| | | | | 709/203 |
| 2010/0095221 A1* | 4/2010 | Doppler | | H04M 1/72427 |
| | | | | 715/747 |
| 2013/0276079 A1* | 10/2013 | Foulds | | H04L 63/18 |
| | | | | 726/7 |
| 2015/0120591 A1* | 4/2015 | Yoakum | | G06Q 10/105 |
| | | | | 705/320 |
| 2015/0222584 A1* | 8/2015 | Holliday | | H04L 51/22 |
| | | | | 715/752 |
| 2016/0021035 A1* | 1/2016 | Shen | | H04L 12/1818 |
| | | | | 709/206 |
| 2017/0011383 A1* | 1/2017 | Melzer | | G06Q 20/223 |
| 2017/0337628 A1* | 11/2017 | Arnall | | G06Q 50/16 |
| 2018/0159805 A1* | 6/2018 | Jones | | G06F 40/274 |
| 2019/0281387 A1* | 9/2019 | Woo | | G06F 3/165 |

* cited by examiner

Fig 6

MANAGING EXCHANGE OF INSTANT MESSAGES USING AN ASSIGNED COMMUNICATION CODE

CROSS-REFERENCES TO RELATED APPLICATIONS

The present application claims benefit from U.S. provisional Patent application No. 62/575,529 filed on Oct. 23, 2017, incorporated hereby by reference in their entirety.

FIELD OF THE INVENTION

The present invention relates to instant messaging communication, and in particular, to exchanging instant messages using an assigned communication code.

BACKGROUND

Instant messaging is a type of a real-time communication which offers exchange of content between parties, including text, visual and audio transmissions over communication networks.

Such instant messages (IMs) can be exchanged. i.e., be received and sent by the parties, using different computerized instant messaging platforms for exchanging content, such as mobile instant messaging applications, web-based IM applications, online chat rooms and others.

The instant messages are typically transmitted bi-directionally between two parties, where each party prepares the message and sends it to the other party, and each party participating in the communication, is identified in most cases by a name, or by a phone number. In some cases, such names can be a user name, or the user's electronic mail account. Facebook's instant messenger uses the person's account identifier as the name. In some other cases, the name used in the instant messaging application can be the contact name in the Telephone Application in a mobile telephone device. Instant messaging applications offer communication between parties which have agreed to communicate using the application. Thus, the user identity is associated with the instant messaging application. Furthermore, coupling between the identity of the user and the instant messaging application requires the user to utilize the same identity factor, associated with the same contact details, name, location, and private information in all instant message sessions conducted by the instant messaging application. The instant messaging server uses the identifier inputted by the user as an identifier only, used by the messaging server to decide which device/devices receive a message. The identifier does not have additional functionalities.

In addition to utilizing the same identity factor in all sessions conducted by the instant messaging application, parties who wish to exchange instant messages via an instant messaging platform are bound by any properties defined by the platform provider, and cannot change any properties relating to the platform or to the exchange of instant messages in the platform between the parties.

GENERAL DESCRIPTION

The present invention discloses a method and system for exchanging instant messages (IM) in a computerized communication between parties. The parties can be an initiator, who initiates the IM communication, and one or more participants. The exchange of IMs in such IM communication can be for an ad-hoc subject in an interim session between parties, or can refer to ongoing communication between parties. In some cases, IM communication is facilitated by an IM platform, enabling the exchange of IMs between parties.

An IM communication is associated with at least one property. The properties regulate how participants communicate with the initiator under the specific IM communication.

An IM communication is enabled after the initiator requests a server to generate a code assigned to IMs. Such code is referred to in this specification as IM assigned communication code (IM code). The IM code is used as an identifier of the initiator, e.g. by including a name or code identifying the initiator.

The initiator of the IM code can determine properties for the IM communication and can include the properties with the request for IM code (IM code properties). In response, the IM code is generated based on the request, and according to the IM code properties.

Once the IM code is generated, it is distributed for the use of one or more participants. Subsequently, a participant can input the distributed IM code and exchange IMs with the initiator of the IM code.

The terms "IM" or the plural "IMs" refer in the specification to instant messages exchanged in a computerized communication between parties, or to the technology of instant messaging, used when exchanging instant messages, optionally while using an IM platform.

Thus, an aspect of the disclosed subject matter relates to a method of managing exchange of instant messages (IM), comprising:

receiving a request from an initiator to generate an instant messaging code (IM code), the IM code is used as an identifier of the initiator, the request includes at least one IM code property that facilitates regulation of instant messages (i) originated by any one of at least one participant in an exchange of instant messages with the initiator, or (ii) received by anyone of the at least one participant in an exchange of instant messages with the initiator;

generating the IM code according to the at least one IM code property and distributing the IM code, for use by anyone of the at least one participant;

identifying that an active participant of the at least one participant inputs the IM code; and selectively regulating instant messages originated by or received by the active participant according to the IM code properties.

In addition to the above features, the method of this aspect of the presently disclosed subject matter can optionally comprise one or more of features (i) to (viii) listed below, in any technically possible combination or permutation:

i. Wherein the method further comprises providing an IM platform associated with the generated IM code, the IM platform facilitate the exchange of the IMs; and regulating the IMs in the IM platform.

ii. Wherein the at least one IM code property including at least one of selected from a group comprising: a visual IM code property and a functional IM code property.

iii. Wherein distributing the IM code includes at least one selected from a group comprising: sending the IM code to the initiator and publishing the IM code.

iv. Wherein the request includes data relating to at least one designated participant.

v. Wherein the designated participant is selected from a contact list associated with the initiator and the request includes data relating to the selected designated participant from the contact list.

vi. Wherein at least two designated participants are selected from the contact list, which together with the initiator constituting a group of participants, and wherein the at least one IM code property facilitates regulation of IMs between the designated participants and the initiator in the exchange of IMs in the group.

vii. Wherein the at least one IM code property includes authorization of at least one participant to modify the at least one IM code property.

viii. Wherein the at least one IM code property includes authorization of at least one participant to modify the at least one IM code property.

According to another aspect of the presently disclosed subject matter there is provided a system of managing exchange of instant messages (IM), the system comprising a processing unit and at least one storage device, the system being configured to:

receive a request from an initiator to generate an instant messaging code (IM code), the IM code is used as an identifier of the initiator, the request includes at least one IM code property that facilitates regulation of instant messages (i) originated by any one of at least one participant in an exchange of instant messages with the initiator, or (ii) received by anyone of the at least one participant in an exchange of instant messages with the initiator;

generate the IM code according to the at least one IM code property and distribute the IM code, for use by anyone of the at least one participant;

identify that an active participant of the at least one participant inputs the IM code; and selectively regulate instant messages originated by or received by the active participant according to the IM code properties.

According to yet another aspect of the presently disclosed subject matter there is provided a non-transitory computer readable storage medium retaining a program of instructions, the program of instructions when read by a computer, cause the computer to perform a method of managing exchange of instant messages (IM), comprising:

receiving a request from an initiator to generate an instant messaging code (IM code), the IM code is used as an identifier of the initiator, the request includes at least one IM code property that facilitates regulation of instant messages (i) originated by any one of at least one participant in an exchange of instant messages with the initiator, or (ii) received by anyone of the at least one participant in an exchange of instant messages with the initiator;

generating the IM code according to the at least one IM code property and distributing the IM code, for use by anyone of the at least one participant;

identifying that an active participant of the at least one participant inputs the IM code; and selectively regulating instant messages originated by or received by the active participant according to the IM code properties.

It is further an object of the subject matter to disclose a method of managing and displaying exchange of instant messages (IM), comprising receiving a request from an initiator to generate an instant messaging code (IM code), said IM code is used as an identifier of the initiator as a recipient of instant messages; receiving IM code properties from the initiator, said properties regulate exchange of instant messages between participants and the initiator of the IM code; identifying that a participant inputs the IM code as a destination of an instant message; formatting a display of the instant messaging application used by the participant according to the IM code properties as long as the participant selects to use the IM code. In some cases, the method further comprises receiving a media file from the initiator, said media file is defined as a visual property of the IM code.

In some cases, the method further comprises transmitting the media file to the participant's device upon detecting that the participant inputs the IM code into the instant messaging application for the first time. In some cases, the method further comprises displaying the media file on the participant's device any time the participant views or uses the IM code. In some cases, the initiator is associated with multiple IM codes and a single participant exchanges instant messages with the initiator via different IM codes according to a subject associated with the IM code in use.

In some cases, the method further comprises transmitting a first set of rules to the participant's device upon detecting first use of the IM code, the set of rules reflecting the AIMCC properties. In some cases, the method further comprises transmitting a second set of rules to the participant's device upon detecting first use of a second IM code, the second set of rules differs from the first set of rules and reflects the second IM code properties.

In some cases, the initiator is a business, and the participant buys goods or services from the business by exchanging instant messages using the IM code, wherein a different set of rules is transmitted to the participant after the first interaction with the business. In some cases, the first set of rules differs from one participant to a second participant, thus providing a first format to the one participant and providing a second format to the second participant. In some cases, the set of rules is transmitted to the participant according to prior behavior of the participant when exchanging instant messages with the initiator.

In some cases, the method further comprises adjusting the properties periodically according to definitions inputted by the initiator. In some cases, the first set of rules defines disabling a portion of the keys in the participant's device. In some cases, the first set of rules differs from one participant to a second participant, thus enabling functionalities to the one participant and disabling the same functionalities from the second participant. In some cases, the first set of rules defines limitations in instant messages sent from the participant's device to the initiator.

In some cases, the limitations are selected from a group consisting of number of messages, length of message, color of message, structure of message, time elapsing between messages, characters used in messages, and a combination thereof. In some cases, the method further comprises sending the IM code from the initiator's device to a contact person of the initiator.

BRIEF DESCRIPTION OF THE DRAWINGS

In order to better understand the subject matter that is disclosed herein and to exemplify how it can be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the invention. However, it will be understood by those skilled in the art that the presently disclosed subject matter can be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "receiving", "generating", "distributing", "identifying", "regulating", "sending" or the like, refer to the action(s) and/or process (es) of a computer that manipulate and/or transform data into other data, the data represented as physical, such as electronic, quantities and/or the data representing the physical objects. The term "computer" should be expansively construed to cover any kind of electronic device with data processing capabilities, including, by way of non-limiting example, processing unit 201 disclosed in the present application.

The terms "processing unit", "computer", "processing device", "computer processing device" or the like should be expansively construed to include any kind of electronic device with data processing circuitry, which includes a computer processor as disclosed herein below (e.g., a Central Processing Unit (CPU), a microprocessor, an electronic circuit, an Integrated Circuit (IC), firmware written for or ported to a specific processor such as digital signal processor (DSP), a microcontroller, a field programmable gate array (FPGA), an application specific integrated circuit (ASIC), etc.) and is capable of executing various computer instructions (stored for example on a computer memory operatively connected therewith).

The operations in accordance with the teachings herein can be performed by a computer specially constructed for the desired purposes or by a general-purpose computer specially configured for the desired purpose by a computer program stored in a computer readable storage medium.

Figure 2:
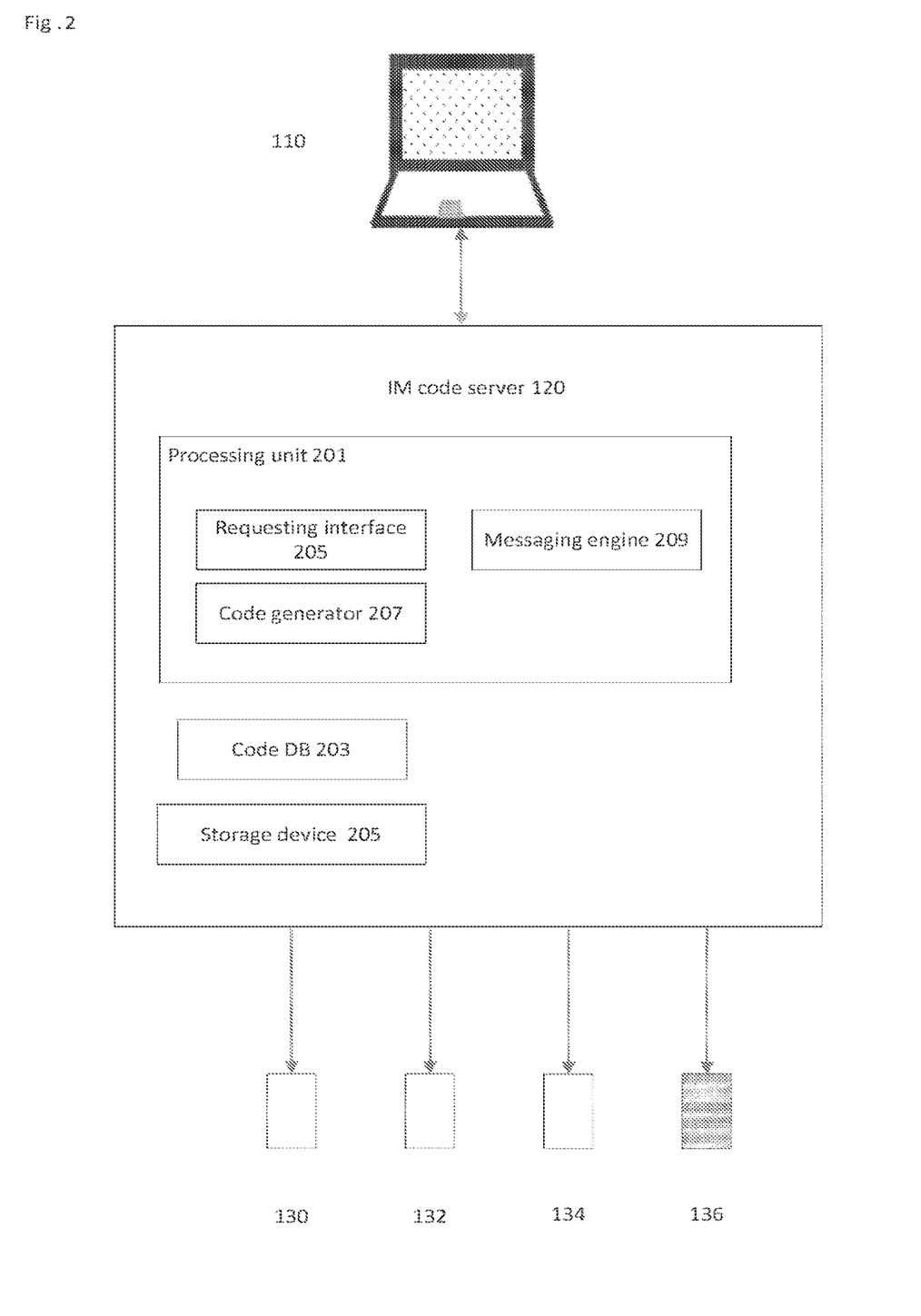
FIG. 2 illustrates a schematic block diagram of a computerized IM code server, in accordance with certain examples of the presently disclosed subject matter.

FIG. 2 described below illustrates a general schematic of a block diagram of a system architecture, including a computerized IM code server in accordance with an embodiment of the presently disclosed subject matter. Different modules in FIG. 2 can be made up of any combination of software and hardware and/or firmware that performs the functions as defined and explained herein. The modules in FIG. 2 can be centralized in one location or dispersed over more than one device. In different examples of the presently disclosed subject matter, the server can comprise fewer, more, and/or different modules than those shown in FIG. 2.

Figure 3:
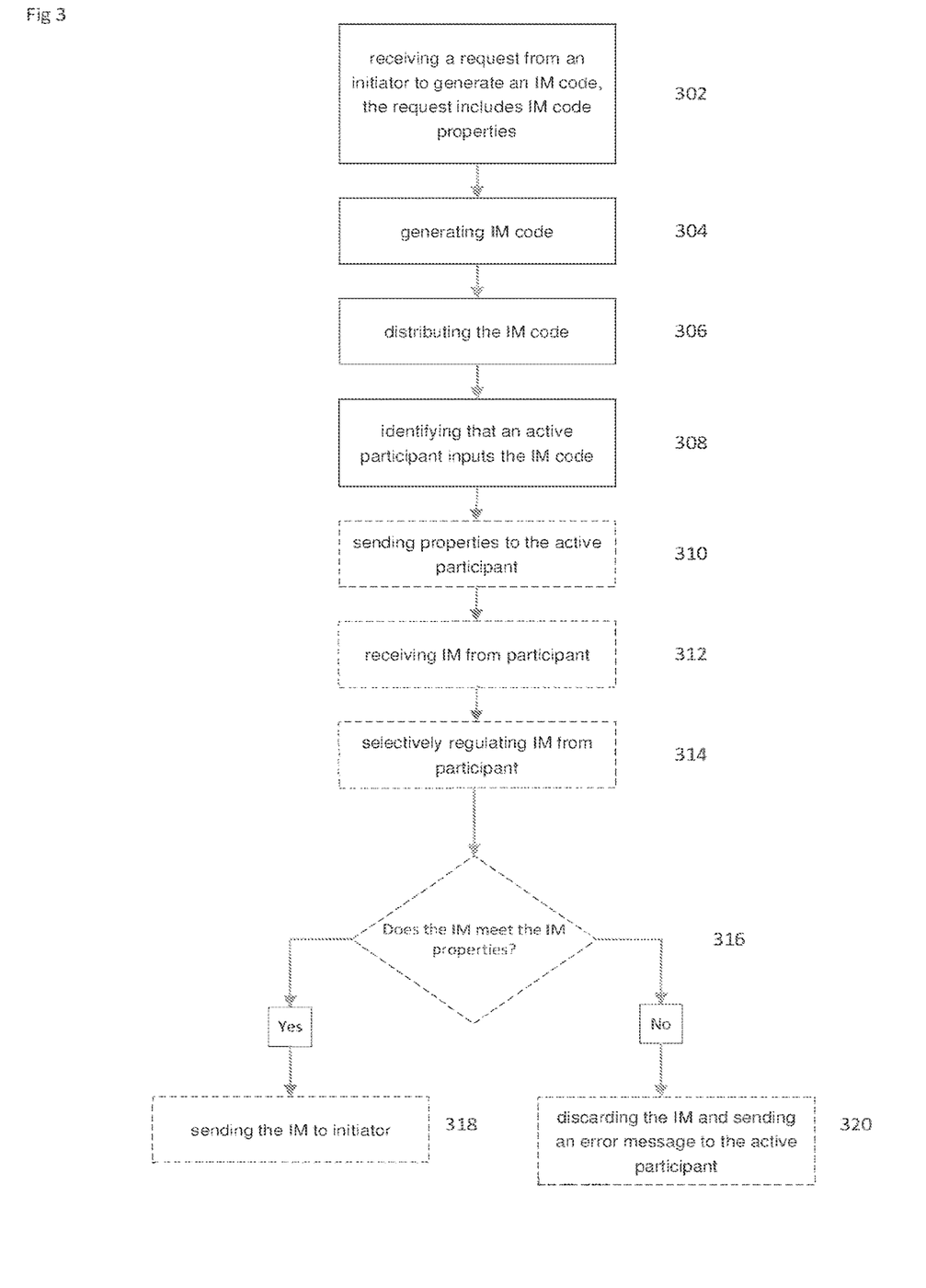
FIG. 3 illustrates a flowchart of operations carried out in managing exchange of IMs, in accordance with certain examples of the presently disclosed subject matter.
Figure 4:
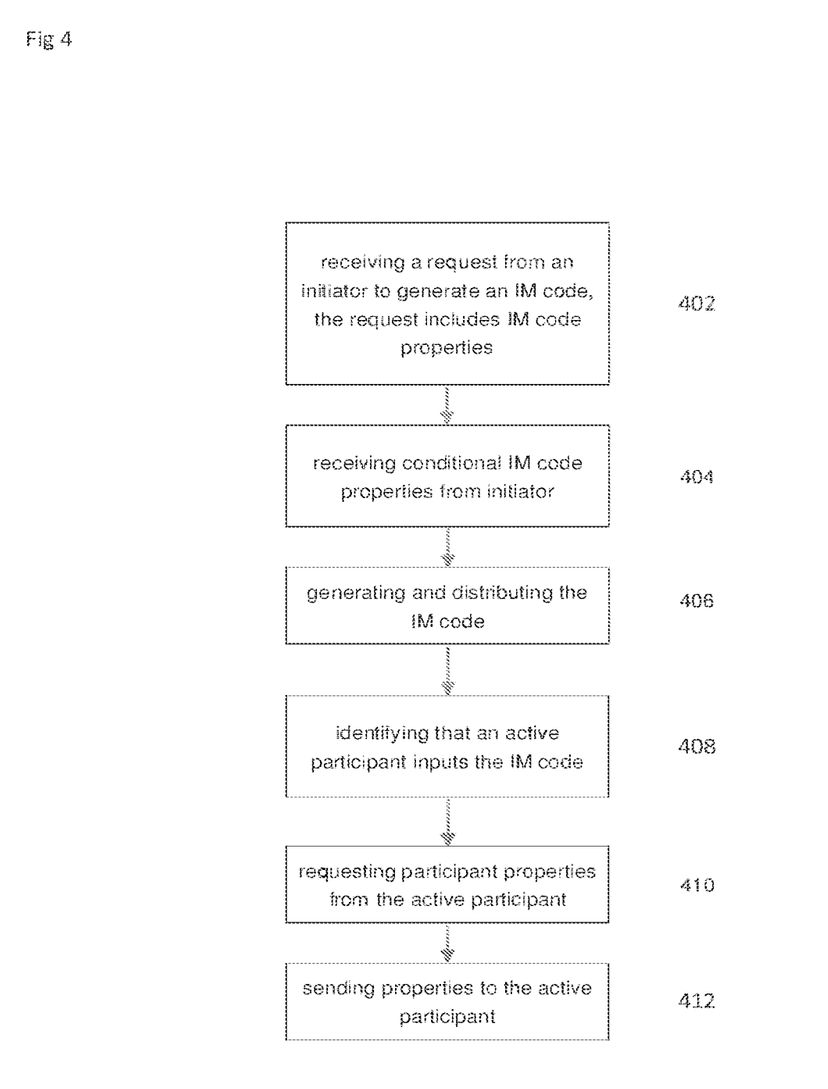
FIG. 4 illustrates another flowchart of operations carried out in managing exchange of IMs with conditional IM code properties, in accordance with certain examples of the presently disclosed subject matter.
Figure 5:
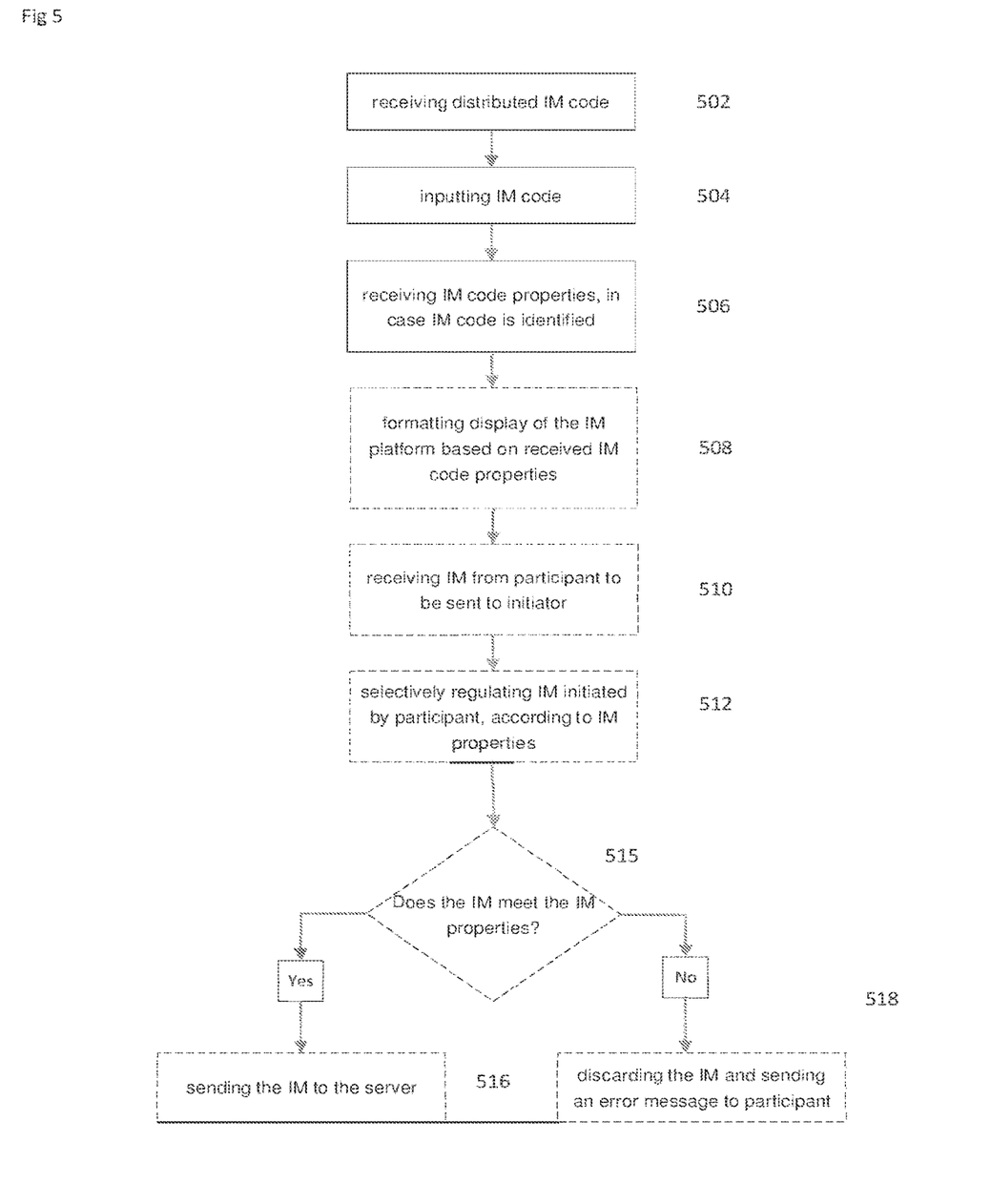
FIG. 5 illustrates a flowchart of operations carried out in managing exchange of IMs from the participant's side, in accordance with certain examples of the presently disclosed subject matter.

FIGS. 3-5 show flowcharts of operations carried out in accordance with examples of the presently disclosed subject matter. In embodiments of the presently disclosed subject matter, fewer, more and/or different stages than those shown in FIGS. 3-5 can be executed. Also, operations can be carried in an order different than that illustrated. For example, an initiator can send a request to generate IM code, and a subsequent message with IM properties associated with his request. Alternatively, the initiator can send one request including both the request to generate an IM code, and the IM code properties.

Figure 1:
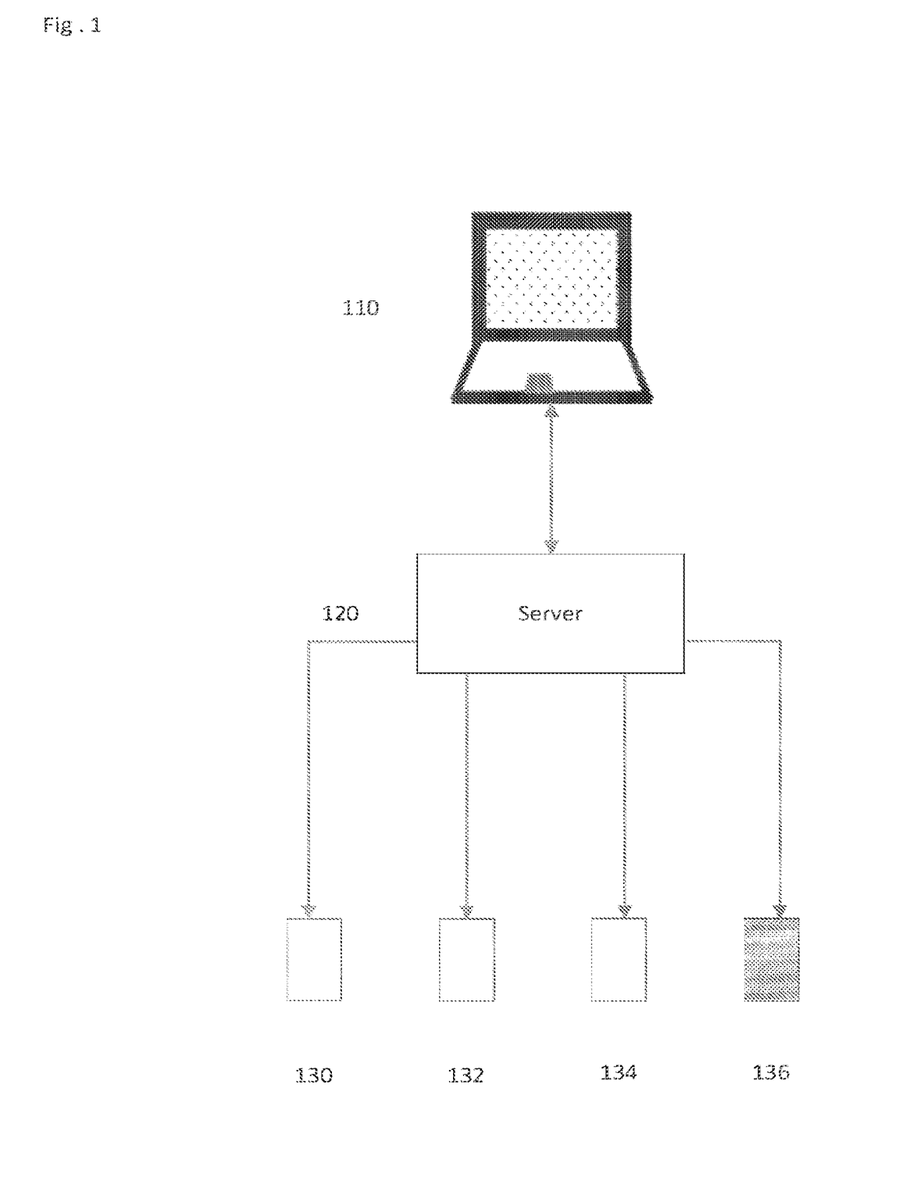
FIG. 1 is a schematic illustration of a computerized instant messaging environment, in which parties communicate, in accordance with certain examples of the presently disclosed subject matter.

Reference is now made to FIG. 1 illustrating a schematic computerized instant messaging (IM) environment, in which parties communicate, in accordance with certain examples of the presently disclosed subject matter.

The environment includes a computerized device 110 associated with an initiator, a server 120 and multiple computerized devices 130, 132, 134, 136, each associated with one or more participants (a participant's device). Computerized device 110 is used by the initiator to request generation of an IM code from the server 120. The initiator's request includes one or more IM code properties. The properties define the characteristics of the IMs exchanged between the initiator and the participants by facilitating regulation of instant messages originated by or received by a participant in an exchange of IMs with said initiator.

In some examples, the IM code properties apply to any session of communication between the participants and the initiator under the specific IM code. In some other examples, an initiator has more than one IM code, each including different IM code properties. The same participant can exchange IMs with the initiator in more than one IM code.

The properties can be visual or functional. Visual properties can relate to visual characteristics of the IMs and can affect the display on the participant's device when sending an IM to the initiator, such as properties relating to images, video, audio, colors and the like. For example, visual properties can relate to inclusion of a selected image as a background, to change the font to be in a certain color, etc. In some other cases, the visual properties can be applied by downloading the media from a link associated with the IM code server or with the IM application. In such cases, the IM application stores links to the media and accesses the links in accordance with the IM properties inputted by the initiator, for example when the participant first sends an IM to the initiator. For example, a fan of basketball wishes to exchange IMs with other fans of basketball. Hence, the fan, constituting an initiator in this example, requests to generate an IM code. The request includes also a visual property that Michael Jordan's image is used as a background image. The fan can upload Michael Jordan's image to the IM server, can send a link to the image, or can request the server to provide a suitable image. Upon inputting the IM code by any other fan, constituting a participant, the server identifies that IM code was inputted, and downloads Michael Jordan's image to the participant's device. Any additional content that was included as IM code properties can also be downloaded from the IM code server to the participant's device. The fan, as initiator, can define other visual properties which affect the display on the participant's device when sending an IM to the assigned code, such as other images, video, audio, colors and the like. In some other cases, the visual properties can be applied by downloading the media from a link associated with the IM code server or with the messaging application. In such cases, the messaging application can store links to the media and access the links in accordance with the properties inputted by the initiator, for example when the participant first sends a message to the IM code. Other types of visual properties can be included in the initiator's request.

IM code properties can also be functional. Functional IM code properties relate to functional characteristics of the IMs that can be received from the participant. For example, the initiator can define a property such that each participant can only send a maximum of three messages for a specific IM code. After the third message, the participant can only view the messages exchanged with the initiator, or receive messages from the initiator. Another example of functional properties is to allow only numbers/text to be inputted in IMs by the participant, or defining an activity time, i.e. a certain time of day at which exchange of communication is enabled. Another example is running a survey or a study, and limiting the participant's messages according to the answers to the study, for example a multiple answers survey (questionnaire), in which the participant is only allowed to mark the relevant option. For example, if the initiator is a business, the business wishes participants to exchange IMs relating to only goods or services of the type that exist at the business. Hence, the business includes a functional property limiting the participants to predefined selections only.

In some examples, default properties are included in the request. Alternatively or additionally, some properties are provided by server 120 while generating the IM code. For example, a basketball fan can request to define a visual property such that Michael Jordan's image is used as a background image, and can request the server to provide an image of Michael Jordan to be used.

In some cases, IM code properties associated with an IM code can be modified at any stage, including after generation of the IM code. Modification to the IM code properties includes removal, update or addition of properties to the IM properties associated with an IM code. After the IM code properties are modified, the IM code associated with the IM modified properties is also updated, to reflect the modified IM code properties.

In some cases, different visual and/or functional properties can be defined for optional certain characteristics of future participants who input the IM code. Once a specific participant with certain characteristics inputs the IM code, the exact IM code properties can be determined based on the participant's characteristics. Alternatively or additionally, the IM properties can be determined and updated, based on data captured during an IM session between the participant and the initiator and the like.

For example, different visual backgrounds for males and females can be defined, different backgrounds according to prior usage history, or prior messaging history with a specific IM code. For example, a new customer (when the initiator is a business) can have a different visual background than a customer already registered in an initiator's business records. Similarly, different functionalities can be enabled according to the participant's location, such as different language options.

In some cases, exchange of the IMs is facilitated by an IM platform. Some examples of IM platforms include mobile device IM applications and web-based IM applications. The IM platform enables exchange of the IMs, according to the IM code properties, in a manner that at least some properties influence the visual display or functionality of the platform. Further details will be provided below.

Referring back to FIG. 2, in response to the request of the initiator to generate an IM code, server 120 generates the IM code. The generated IM code appearance or structure can be alphanumeric, can include additional symbols, and can be an image scanned by a participant's device. In some cases, the IM code can be operated by an IM platform with Internet connection capabilities. The generated IM code is used as an identifier of the initiator, e.g. the generated IM code includes data indicative of the initiator, such that the IM code can later be utilized by server 120 to obtain details of the initiator in order to send IMs received from participants under the generated IM code.

Server 120 generates the IM code according to the properties included in the initiator's request, e.g. by including the visual and/or functional properties included in the request. For example, if an initiator request includes a visual property that the IMs platform page uses an image as a background, and the request also includes that image, then the generated IM code would include the visual property of the image as well. Alternatively or additionally, the IM code can be associated with IM code properties, which are stored in server 120.

Once the IM code has been generated, server 120 distributes it for use by participants. For example, IM codes can be distributed by being displayed on an Internet website, social media, business card, newspaper and the like, or delivered verbally from one person to the other. Alternatively or additionally, the IM code can be distributed by sending a copy thereof to the initiator and the initiator further distributes it to participants, e.g. via sharing the IM code in a social network.

The environment further includes multiple computerized devices 130, 132, 134, 136, each associated with one or more participants (a participant's device). Each participant that wishes to exchange IMs with the initiator has to input the distributed IM code. For example, if the IM code is a barcode shared via a social network, a participant has to scan the barcode.

In some cases, the generated IM code includes or is associated with a visual property affecting the display of the IM platform in the participant's device, as illustrated in FIG. 1, where the display of computerized device 136 is different than the display of computerized devices 130, 132 and 134. In this example, the different display is a result of a different IM code property associated with the IM code inputted by the participant associated with device 136. The IM code inputted by any of participants associated with devices 130, 132 and 134 is different. Alternatively, the characteristics of the participant associated with device 136 are different than the characteristics of the participants associated with devices 130, 132 and 134, thus applying different visual properties in the same IM code.

Turning now to FIG. 2, FIG. 2 illustrates a schematic block diagram of a computerized IM code server 120 illustrated in FIG. 1, in accordance with certain examples of the presently disclosed subject matter.

IM code server 120 is designed to operate as a standalone computerized device and operate a system which provides IM code server functionalities. In some cases, such standalone computerized server 120 may be a personal computer, computer program, or a device that provides IM server functionality for the initiator, participants, and a third party who acts on behalf of either the initiator or the participants. In some other cases, the computerized server 120 may be a virtual computer running on a server cluster, or a cloud service connected to a communications network.

The IM code server 120 comprises or is otherwise operatively connected to one or more processing units such as processing unit 201 for controlling and executing various operations relating to the functionalities of the IM code server 120. Each processing unit comprises a respective processing circuitry comprising at least one computer processor which can be, for example, operatively connected to a computer-readable storage device storing computer instructions to be executed by the computer processor (e.g. storage device 203). According to some examples, different functional elements (units, modules, executables) in server 120 can be implemented as a dedicated processing unit comprising a dedicated computer processor and computer storage for executing specific operations.

Additionally or alternatively, one or more functional elements can be operatively connected to a common processing unit configured to execute operations according to instructions stored in the functional elements. For example, processing unit 116 can comprise one or more computers or processing units, which can be configured to execute several functional modules in accordance with computer-readable instructions stored on a non-transitory computer-readable medium (e.g. storage device 203) operatively connected to a computer processor. For illustrative purposes, such functional modules are referred to hereinafter as comprised in processing unit 201.

In some cases, the processing unit 201 is a physical processor unit located within the IM code server 120. In some other cases, the processing unit 201 can be a virtual computer processor unit provided by a virtual resource such as a virtual machine manager which allows multiple operating systems to share a single hardware host.

IM code server 120 also comprises computer-readable storage device storing computer instructions to be executed by the computer processor (e.g. storage device 203) designed to be utilized by the IM code server 120 in the operation and the processes of the IM code server. In some cases, storage device 203 can be a physical memory such as a random-access memory. In some other cases, storage device 203 can be a virtual memory provided by a virtual resource such as a virtual machine manager which allows multiple operating systems to share a single hardware host.

In some examples, processing unit 201 can comprise a requesting interface 205 designed to be utilized by initiators, e.g. when using computerized device 110, and participants. e.g. when using computerized devices 130, 132, 134, 136. For example, the requesting interface 205 can provide the required functionality for an initiator to request to generate an IM code, or provide the required functionality for the participants to input the distributed IM code. In some cases, the requesting interface 205 can be in a user graphic interface which can be accessed via Internet connection. In some other cases, the requesting interface 205 provides a "command line interface", or an application programming interface which can be utilized by computerized devices such as 110 or 130, 132, 13, 136.

In some cases, server 210 may require a participant inputting an IM code to undergo an identification process. In such cases, the participant can communicate with server 120 by communicating with requesting interface 205.

In some examples, processing unit 201 can comprise a code generator 207. Once an initiator submits a request for an IM code, including IM code properties, e.g. via requesting interface 205, the request, along with the IM code properties included in the request, are forwarded to code generator 207. The IM code generator is configured to generate an IM code in response to a request from an initiator. The generated IM code is used as an identifier of the initiator. Furthermore, the IM code is generated according to the properties received from the initiator. Thus, for example, if the initiator includes in the request a visual property that the IMs platform page uses an image as a background, and the request also includes that image, code generator 207 generates IM code that includes this visual property, such that any participant who later receives the generated IM code and inputs the IM code, will view the image as a background. Alternatively or additionally, the IM code can be associated with IM code properties, which are stored in server 120.

In some examples, once code generator 207 generates IM code, it stores the generated IM code in a code database (DB) 203, associated with processing unit 201.

In some cases, in addition to storing the generated IM code in Code DB 203, code generator 207 distributes the generated IM code for use by one or more participants. Distributing the IM code can occur in computerized or non-computerized media, e.g. publishing the IM code on a website, as will be further explained below.

In some examples, processing unit 201 can comprise a messaging engine 209 designed to enable exchange of IMs between the initiator and the participants.

Attention is now drawn to FIG. 3 illustrating a flowchart of operations carried out in managing exchange of IMs, in accordance with certain examples of the presently disclosed subject matter.

In some examples, at block 302, a request to generate an IM code is received from an initiator. In some cases, an initiator requests to create an IM code for sending and receiving IMs for a common purpose, e.g. advertising or publishing offers to people interested in a particular purpose or subject. Such a purpose can be a business offering to sell goods or services, a proposal to gather in order to achieve a particular social purpose, and the like. In some other cases, such offers can be a request to purchase goods or services, or to establish contact, for any particular purpose the initiator may wish to publish.

The request can include IM code properties that facilitate regulation of IMs originated by any participant or received by a participant in an exchange of IMs with the initiator. As explained above, the properties can be visual properties or functional properties. One example of a visual property is inclusion of a background image as a background in the IM platform used by the participant's device. One example of functional property is limiting the activity hours during which IMs from the participant can be sent. In some examples, an initiator can request to generate more than one IM code, where each request includes different IM properties.

The request from the initiator for generating an IM code can include IM code properties. Alternatively or additionally, one or more properties can be requested in a separate request, which can later be modified, as explained above.

In some cases, the request can be made by a third party. A third party, e.g. a business, can make a request on behalf of the initiator, where the later IMs are exchanged with the initiator directly. In such cases, the request also includes data indicative of the initiator, such that the generated IM code can be used as an identifier of the initiator.

In some cases, the request can be received at requesting interface 205 of processing unit 201 illustrated in FIG. 2.

At block 304 an IM code is generated. The generated IM code is used as an identifier of the initiator. Furthermore, the IM code is generated according to the properties received from the initiator in block 302. In case an initiator submits more than one request, where each request includes respective IM code properties, a separate IM code is generated in response to each request, and each separate IM code includes the respective IM code properties included in the respective request.

In some examples, the IM code is generated by code generator 207 illustrated in FIG. 2.

After the IM code is generated, it is distributed, at block 306. Distribution can be by publishing the IM code in computerized media, such as on a website or computer applications, by sharing via social media and such, but can be done also using non-computerized media, such as publishing the IM code in a newspaper, on a billboard, in a commercial provided over the phone, on television, or radio transmissions and the like. The IM code can be delivered verbally from one person to another. Alternatively or additionally, the IM code can be distributed by providing a copy of the IM code to the initiator, and the initiator further distributes the generated IM code, e.g. while using one or more of the computerized or non-computerized media mentioned above.

In some examples, the IM code is distributed to a third party entity to be further distributed by the third party via a commercial website. In such cases, the viewers of the commercial website are able to input the IM code and send IMs to the initiator according to the distributed IM code. In some examples, the IM code is distributed by code generator 207 illustrated in FIG. 2.

The following is a specific example of a request from an initiator to generate an IM code in accordance with the blocks of FIG. 3, where the request includes details of a defined subject. At block 302, the request to generate an IM code includes also a defined subject. For example, the defined subject included in the request can be "selling a vehicle, Toyota Corolla, in New York". At block 304, the generated IM code can be associated or include identifying details of the defined subject e.g., generating an IM code called "toy.coro.NYC.64". Any IM code properties included in the request can be associated with the generated IM code. Alternatively, IM code properties can be selected, e.g. by code generator 207 illustrated in FIG. 2. The suggested IM code properties are based on the defined subject. For example, the IM code properties can be selected according to a predefined set of rules determined by the initiator. Alternatively or additionally, the visual properties of the code can be selected based on a location inputted by the initiator, for example New York City, or an item inputted by the initiator, such as Toyota. Yet alternatively or additionally, a property, or a set of properties, can be selected from a plurality of sets of properties according to input provided by the initiator along with the request to generate IM code.

Referring back to the general description of FIG. 2, participants become aware of the distributed IM code in the media selected by the initiator, the server or the third party. Any participant, such as a participant associated with computerized device 136 illustrated in FIG. 2, seeking to communicate with an initiator under the distributed IM code, can input the IM code, thus constituting an active participant. For example, if the IM code is a link to a website, the active participant inputs the IM code by clicking on the link. Further options of inputting an IM link are illustrated below, with reference to FIG. 4.

At block 308, inputting of the IM code by an active participant is identified. In some cases, identifying that an active participant inputs the IM code includes receiving an IM code from a participant, comparing the received IM code to stored IM codes, and confirming that a match was found.

According to some cases, if the received IM code is identical to a stored IM code, then at block 310 the IM code properties associated with the stored IM code are sent to the participant. In some examples, the IM code properties are sent by processing unit 201 to the active participant, e.g. by sending it to the computerized device 136 associated with the active participant, illustrated in FIG. 2.

Consider an example of a journalist who wishes to generate an IM code to be used by his readers. The journalist requests to generate an IM code, and include a visual property that the background of the IM platform be an image of a newspaper, and a functional property defining activity hours, such that IMs originated from participants can be sent only between 8:00 and 17:00. The IM code generated in response to the journalist's request, includes the above properties and can be used as an identifier of the journalist. e.g. by identifying him by his name. The IM code is then distributed. e.g. by publishing it on a website associated with the journalist. Assume an active reader inputs the IM code, e.g. by scanning its barcode into an IM application. After identifying that the IM code was inputted by an active reader, the visual property defining a newspaper background and the functional property of activity hours are sent to the active reader, e.g. by sending the IM properties to the device associated with the active reader.

At block 312, IMs originated by the active participant are received. In some cases, identifying details of the initiator are extracted from the IM code to provide an indication of the destination of the received IM.

At block 314, the IMs originated by the active participant are selectively regulated to confirm that the IMs are according to the IM code properties. In some cases, in exchanging communication with participants, the initiator sends IMs without any properties regulating the IMs, whereas when a participant sends IMs to the initiator, the IMs must meet any IM code properties associated with the IM code.

In some cases, regulation can be achieved by sending the properties to the computerized device associated with the active participant, and applying the properties in the IM platform itself. In case the IM code includes visual properties, an agent operating in the device, associated with the active reader, will display in the IM platform the IM properties that were received, e.g. displaying the background image of a newspaper in the example of the journalist. In case the IM code includes functional properties, the agent can disable functional elements that do not meet the properties, for example by disabling the function of the keyboard in the IM platform at all hours, except from 8:00 to 17:00. Since the IM properties include both visual properties as well as functional properties, in some case, selectively regulating IMs originated by the active participant includes regulating one or more of the IM properties in the participant's device, e.g. by an agent operating in the participant's device, and regulating one or more of the IM properties in IM server 120.

Other options for selectively regulating the IM properties exist, for example, the active participant can be allowed to send any IMs to the server. The IMs that are received at server 120 are confirmed as meeting the IM properties (block 316). In case the IMs do meet the IM code properties, the IMs are sent to the initiator (block 318). In case the IMs do not meet the IM properties, the IMs are discarded, and optionally an error message is sent to the active participant (block 320). In some examples, the regulation of IMs is performed using processing unit 201 illustrated in FIG. 2.

In some examples, some or all of the identifying details of either or both the participant and the initiator are not disclosed to the other party, such that communication is based on the IM code and participants' ID as the identity factors and addressees. In some other cases, the participants and/or the initiator can agree to expose certain personal contact details. For example, a participant or the initiator can agree to expose personal identifying details such as a personal name or telephone number to the other party.

In some cases, the IMs exchanged between the participant and the initiator are identified by the identifiers inputted by the participant and the initiator. Such identifiers are associated to the participant's and initiator's devices, for example via mobile applications installed on mobile phones, tablets and the like. When the participant inputs his/her identity, the participant is defined as a registered user in the IM server. However, the participant can access the initiator from the participant's desktop computer using a code shown on a website, without being registered. This way, the participant is identified to the IM server using a cookie or other software downloaded to the unregistered participant's device. The participant can use the browser in order to exchange IMs, without accessing an account such as an email account or a social media account. When the participant closes the browser, the cookie remains on the desktop computer, so the next time the participant browses, he/she can continue the IM conversation. All limitations and properties disclosed above also apply to the unregistered scenario.

In some cases, an initiator wishes to generate one or more IM codes for exchanging communication with individuals stored in a contact list associated with the initiator. For example, the initiator wishes to have an IM code, having different properties, for each contact stored in a contact list in a mobile device associated with the initiator. In such cases, the initiator includes, in the request for generating IM code, also data relating to a designated participant, e.g. a participant selected from a contact list associated with the initiator. The IM code properties included in the request, will eventually be applied in the exchange of IMs with the designated participant, e.g. the selected contact.

In such cases, with reference to FIG. 3, at block 302, the request, including the selected contact and the IM code properties, is received. Then, at block 304, an IM code is generated, according to the properties and the selected contact. After the IM code is generated, it is distributed, at block 306, e.g. by sharing the generated IM code with the IM platform of the contact. For example, the IM code can be shared with the mobile application installed on the participant's device. Since the initiator can modify the IM properties at any time, including after generating the IM code, in some cases an ongoing update is sent from the IM code server 120 to the IM platform of the contact with any modification to the IM code properties. Any known data update methods can be used in this case, to update a participant on modifications of IM code properties, such as frequent or periodic updates, and any other manner known in the field.

At block 308, inputting of the IM code by an active participant is identified. Since the contact is a selected contact, in some cases, inputting the IM code includes receipt of the IM code at the selected contact's device. Along with, or after distributing the IM code to the selected contact, the IM code properties are sent to the selected contact, who enables exchanging IMs between the initiator and the selected contact under the generated IM code. In some examples, the blocks above as described with reference to generating an IM code with a designated participant, can be executed by IM server 120.

According to some cases, an initiator can define a group of selected participants to exchange IMs in a single group with a shared IM code. An initiator includes, in a request to generate an IM code, data relating to at least two designated participants. e.g. at least two contacts selected from one or more contact lists associated with the initiator. The IM code properties included in the request, will be applied in the exchange of communication with the designated participants, where, together with the initiator, will constitute a group. In a similar manner to that described above with reference to a single designated participant, the IM code is generated based on the request and the additional data included in the request, and is distributed to the designated participants, to be received by their IM platforms and exchange communication in the group.

In some cases, an initiator wishes to create an initial IM code that can be re-defined by one or more participants inputting the IM code. For example, when generating IM code for a designated participant, or for a group of selected designated participants, the initiator wishes to enable the other selected or designated participants to redefine the IM code, including the IM code properties in the IM code. In order to enable one or more other participants to re-define one or more IM code properties, or to define new properties to be associated with the IM code, the IM code properties received from the initiator include authorization of one or more participants to modify one or more IM code properties, in a similar manner, enabling the initiator to modify the IM properties. In some cases, modifying IM code properties includes redefining existing IM code properties, which are included in the generated IM code, but also includes defining new IM code properties, which facilitate regulation of IMs exchanged between the participant and the initiator. In some cases, IM code properties defined by the participant are sent to the IM code server 120. The IM code server associates the new IM code properties with the generated IM code, stores the updated IM code, e.g. in Code DB 203 illustrated in FIG. 2, and distributes the updated IM code to the initiator. In some examples of a group sharing an IM code, in case IM code properties are updated, an updated IM code is also shared with other members of the group. In a similar manner to that described with respect to sending ongoing updates of an IM code to a selected contact, an ongoing update of the IM code properties or an updated IM code can be shared in the group.

FIG. 4 illustrates another flowchart of operations carried out in managing exchange of IMs with conditional IM code properties, in accordance with certain examples of the presently disclosed subject matter.

In some cases, the initiator includes in the request one or more conditional IM code properties. The formatting and regulating of a conditional IM code property in the participant's device depends on various predefined participant properties. Some examples of conditional IM code properties are characteristics relating to the type of participant that inputs the IM code (e.g. the participant's gender), or conditions relating to the environment, such as the location of the participant, etc.

At block 402, a request to generate an IM code is received from an initiator, in a similar manner to that described with respect to block 302 in FIG. 3.

At block 404, one or more conditional IM code properties are received from the initiator. In some cases, one or more conditional IM code properties can be included in the request prior to sending a request for generation of an IM code. Additionally or alternatively, conditional IM code properties can be requested by the initiator during generation of the IM code, or even after the IM code has already been generated, e.g. while exchanging IMs with a participant.

For example, conditional IM code properties can define that the background of the IM platform is black during night time, and blue during daytime, can include format changes according to the participant's gender, geographic location, weather conditions, and the like.

At block 406, in response to receiving a request and optional conditional IM code properties, an IM code is generated and distributed in a similar manner to that described with reference to blocks 304 and 306 in FIG. 3.

At block 408, inputting of the IM code by an active participant is identified. In some cases, identifying that an active participant inputs the IM code includes receiving an IM code from a participant, comparing the received IM code to a stored IM code, and confirming that a match was found. In some cases, conditional IM code properties are identified when comparing the received IM code, and confirming a match. In case such conditional IM code properties are identified, at block 410 participant IM code properties are requested from the active participant. Alternatively, some or all of the participant IM code properties can be automatically obtained e.g. using external databases, such as the time of the day, the participant's location, etc.

Based on received or obtained participant IM code properties, the IM code properties are sent to the active participant at block 412. For example, the IM code defines a black background of the IM platform during night time and a blue background during daytime. Based on the received/obtained time of the day from the participant, the relevant IM code properties are sent to the participant at block 412. The remaining process is similar to that defined in FIG. 3.

Attention is now drawn to FIG. 5 illustrating a flowchart of operations carried out in managing exchange of IMs from the participant's side, in accordance with certain examples of the presently disclosed subject matter. In some examples, the following operations are performed by an agent operating in a computerized device associated with a participant, such as an agent operating in any of devices 130-136 illustrated in FIG. 2.

Once an IM code is generated and distributed, according to some examples the distributed IM code is received at block 502. The IM can be received by participant, e.g. in any computerized or non-computerized media in which the IM code was distributed. For example, an initiator may distribute an IM code in the form of a link by sharing it with its contact list of a social application.

Next, in block 505, an IM code is inputted, e.g. by a participant. For example, a person in the contact list receiving the distributed IM code can input the IM code by pressing the shared link.

In some cases, participants are required to be registered to the IM code server, e.g. with identifying details, or by inputting a temporary participant identity or username. IMs originated by the initiator, are sent using the participants' registration details. Hence, inputting IM code can include also registering to the IM code server.

In some examples, at block 506, in case IM code is identified, the IM code properties are received. In some examples, the participant is able to store the IM code and utilize it for future communication with the initiator.

The IM code properties can be represented as a set of rules in a predefined format. In some cases, the properties can be represented as an executable file to be executed by the IM platform operating on the participant's device.

Optionally, based on the received IM properties, the display of the IM platform is formatted at block 508. In some cases, formatting is visual or functional. Examples of visual formatting are setting the background of the IM platform to be a selected image as provided, or displaying the IMs in a certain manner or shape, such as in bubbles. An example of functional formatting is disabling the functionality of some or all of the keyboard elements, and retaining only those defined as allowed in IM code properties.

In some cases, the IM platform in the participant's device dictates that the participant can only choose to use objects in the IMs from a predefined group of objects. With reference to the example above of a business, the IM code properties define that the IM includes a selection of goods or services of the type that exist at the business only.

In some cases, at block 510, an IM is received from a participant, to be sent to the initiator. In some cases, the IMs exchanged between the participant and the initiator are identified by identifying details (identifiers) inputted by the participant and/or the initiator. Such identifiers are associated with the participant's and initiator's devices, for example via the IM platform, such as a mobile application installed on computerized devices. Once a participant inputs his/her identity, the participant is defined as a registered user in the IM server. In case the participant accesses the initiator from a participant's desktop platform using an IM code shown on a website, without being registered, the participant can be identified using a cookie or other software downloaded to the unregistered participant's device. The participant can use the browser in order to exchange IMs, without accessing an account such as an email account or a social media account. When the participant closes the browser, the cookie remains on the desktop computer, so the next time the participant browses, he can continue the previous IM session.

In some examples, in addition to formatting the display, IMs initiated by the participant are selectively regulated according to IM properties. As explained above with reference to FIG. 3 and blocks 315-320, in some cases, all IMs initiated by the participant are transmitted to the server, and are regulated at the server. Alternatively, in some other examples, in response to a participant originating an IM to be sent to the initiator, IMs initiated by a participant are selectively regulated, according to IM code properties, as illustrated in block 512. In these examples, regulating the IMs can be achieved by applying the properties in the IM platform operated at the participant's device. For example, in case the IM code includes functional properties, functional elements that do not meet the properties are disabled. For example, if the visual properties include IMs with video only, the keyboard in the IM platform is disabled, apart from the option of inserting video. In the example of the IM code properties relating to activity hours between 8:00 to 17:00, the keyboard in the IM platform is disabled at all hours, except from 8:00 to 17:00.

In some cases, if the IMs initiated by the participant meet the IM code properties (block 515), then the IMs are sent to the server (block 516). Otherwise, if the IMs do not meet the IM code properties, then the IMs am discarded, and, optionally, an error message is sent to the participant (block 518). Alternatively, a notification relating to the IM property can be sent to the participant, e.g. informing the participant of the IM property.

Figure 6:
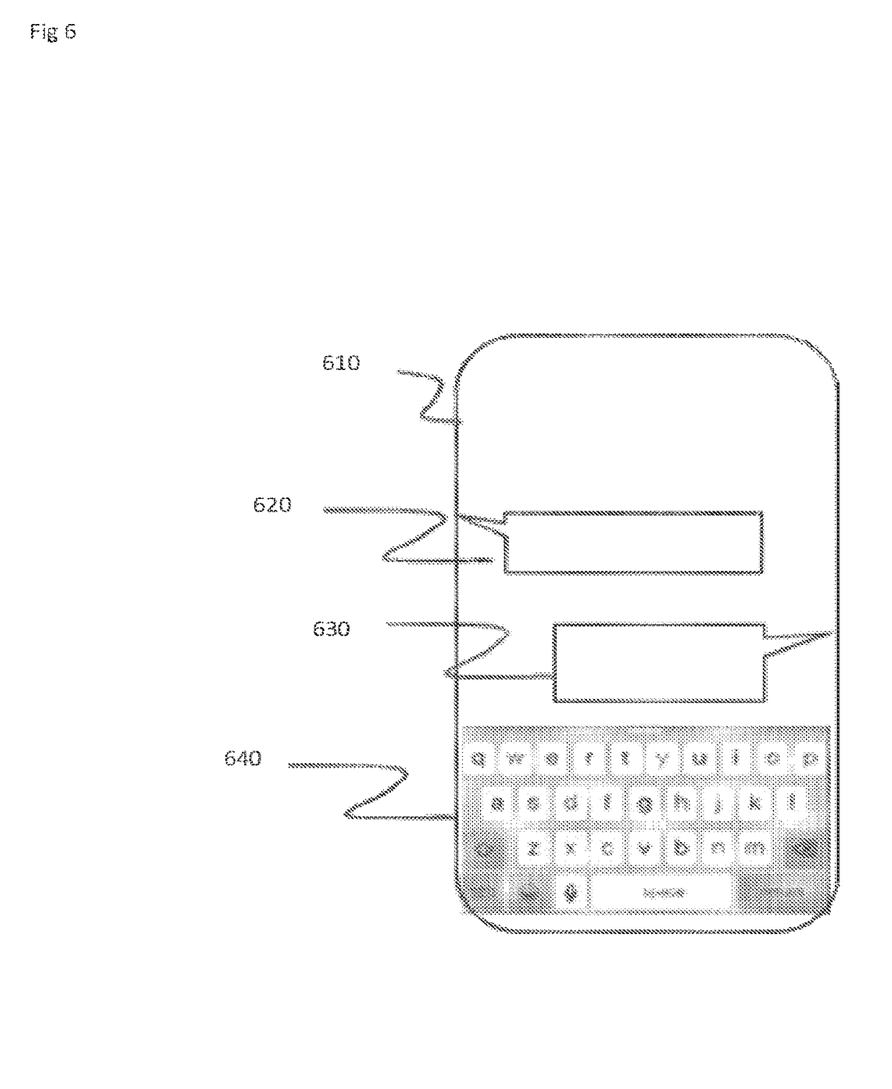
FIG. 6 illustrates a user interface of a client application installed on a participant's device exchanging IMs with an initiator, in accordance with certain examples of the presently disclosed subject matter.

Referring now to FIG. 6, FIG. 6 illustrates an example of a mobile IM application having a user interface installed on a participant's computerized device exchanging IMs with an initiator, in accordance with certain examples of the presently disclosed subject matter. Area 610 shows a background of the user interface shown on the participant's computerized device when exchanging IMs with the initiator. The background can be defined by IM code properties inputted by the initiator. Areas 620 and 630 represent the areas in which IMs are displayed. Areas 620 and 630 can be formatted according to the IM code properties. Such formatting can affect the background of the areas 620, 630, their shapes, outline, size, font settings and the like. Area 640 represents an input unit of the participant, e.g. a keyboard. In some examples, the participant can provide his input by using the input unit. In some cases, the IM code properties limit the manner of text the participant can input. For example, IM code properties define that each IM should not contain more than two words, or only yes/no or a three digits number. In response, the input unit, or parts of the input unit, are disabled.

It is noted that the teachings of the presently disclosed subject matter are not bound by the steps described with reference to of FIGS. 3-5 and the components described with reference to FIG. 2. Equivalent and/or modified functionality can be consolidated or divided in another manner and can be implemented in any appropriate combination of software, firmware and hardware and executed on a suitable device.

Those skilled in the art will readily appreciate that various modifications and changes can be applied to the embodiments of the invention as hereinbefore described without departing from its scope, defined in and by the appended claims.

The invention claimed is:

1. A computerized method of managing exchange of instant messages (IM), comprising:
   receiving, from an initiator, a request to generate an instant messaging code (IM code), wherein the IM code is used as an identifier of the initiator and the request includes at least one IM code property that facilitates regulation of and formatting of instant messages originated by one or more participants in an exchange of instant messages with the initiator, wherein:
      formatting of the instant messages comprises disabling a functionality of at least one keyboard element of one or more participants,
      the request includes data relating to at least one designated participant,
      the designated participant is selected from a contact list associated with the initiator and the request includes data relating to the selected designated participant from the contact list, and
      at least two designated participants are selected from the contact list, which together with the initiator constitute a group of participants, and wherein the at least one IM code property facilitates regulation of IMs between the designated participants and the initiator in the exchange of IMs in the group;
   generating the IM code according to the at least one IM code property and distributing the IM code, for use by the one or more participants;
   identifying that an active participant among the one or more participants inputs the IM code; and
   selectively applying the IM code properties to instant messages that are originated by the active participant and sent to the initiator.

2. The computerized method of claim 1, the method further comprises:
   providing an IM platform associated with the generated IM code, the IM platform facilitating the exchange of the IMs; and
   regulating the IMs in the IM platform.

3. The computerized method of claim 1, wherein the at least one IM code property includes at least one of: a visual IM code property and a functional IM code property.

4. The computerized method of claim 1, wherein distributing the IM code includes at least one of: sending the IM code to the initiator and publishing the IM code.

5. The computerized method of claim 1, wherein the at least one IM code property includes authorization of at least one participant to modify the at least one IM code property.

6. The computerized method of claim 1, wherein the at least one IM code property includes authorization of at least one participant to modify the at least one IM code property.

7. A system of managing exchange of instant messages (IM), comprising:
   a processing unit configured and operable to:
      receive, from an initiator, a request to generate an instant messaging code (IM code) from an initiator, wherein the IM code is used as an identifier of the initiator and the request includes at least one IM code property that facilitates regulation of and formatting of instant messages originated by one or more participants in an exchange of instant messages with the initiator, wherein
         formatting of the instant messages comprises disabling a functionality of at least one keyboard element of one or more participants,
         the request includes data relating to at least one designated participant,
         the designated participant is selected from a contact list associated with the initiator and the request includes data relating to the selected designated participant from the contact list, and
         at least two designated participants are selected from the contact list, which together with the initiator constitute a group of participants, and wherein the at least one IM code property facilitates regulation of IMs between the designated participants and the initiator in the exchange of IMs in the group;
      generate the IM code according to the at least one IM code property and distribute the IM code, for use by the one or more participants;
      identify that an active participant among the one or more participants inputs the IM code; and
      selectively apply the IM code properties to instant messages that are originated by the active participant and sent to the initiator.

8. A non-transitory computer readable storage medium retaining a program of instructions, the program of instructions when read by a computer, cause the computer to perform a method of managing exchange of instant messages (IM), comprising:
   receiving, from an initiator, a request to generate an instant messaging code (IM code) from an initiator, wherein the IM code is used as an identifier of the initiator and the request includes at least one IM code property that facilitates regulation of and formatting of instant messages originated by one or more participants in an exchange of instant messages with the initiator, wherein:
      formatting of the instant messages comprises disabling a functionality of at least one keyboard element of one or more participants,
      the request includes data relating to at least one designated participant,
      the designated participant is selected from a contact list associated with the initiator and the request includes data relating to the selected designated participant from the contact list, and
      at least two designated participants are selected from the contact list, which together with the initiator constitute a group of participants, and wherein the at least one IM code property facilitates regulation of IMs between the designated participants and the initiator in the exchange of IMs in the group;

generating the IM code according to the at least one IM code property and distributing the IM code, for use by the one or more participants;

identifying that an active participant among the one or more participants inputs the IM code; and selectively applying the IM code properties to instant messages that are originated by the active participant and sent to the initiator.

9. The computerized method of claim 1, wherein formatting of the instant messages comprises formatting a display of an instant message platform on which the instant messages are exchanged between the initiator and one or more participants.

10. The computerized method of claim 9, wherein the display comprises at least one of a background of the instant message platform, a participant's gender, a participant's geographic location, or a shape of the instant messages.

11. The computerized method of claim 1, further comprising:
upon detecting a first use of the IM code by a first participant, transmitting a first set of rules to the first participant; and
formatting of the instant messages comprises providing a first format to the first participant.

12. The computerized method of claim 11, further comprising:
upon detecting a second use of the IM code by a second participant, transmitting a second set of rules to the second participant; and
formatting of the instant messages comprises providing a second format to the second participant.

13. The computerized method of claim 12, wherein the first format is different from the second format.

* * * * *